United States Patent
Schubert

[11] Patent Number: 5,960,926
[45] Date of Patent: *Oct. 5, 1999

[54] FRICTION CLUTCH WITH WEAR COMPENSATION

[75] Inventor: Florian Schubert, Amiens, France

[73] Assignee: Valeo, Paris, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/643,106

[22] Filed: May 2, 1996

[30] Foreign Application Priority Data

May 2, 1995 [FR] France .................................. 95 05198

[51] Int. Cl.[6] ...................................................... F16D 13/75
[52] U.S. Cl. ................... 192/111 A; 192/70.25; 192/89.24; 192/109 R
[58] Field of Search ............................ 192/70.25, 111 A, 192/89.24, 109 R

[56] References Cited

U.S. PATENT DOCUMENTS

| | | | |
|---|---|---|---|
| 4,207,972 | 6/1980 | Zeidler | 192/111 A |
| 4,228,883 | 10/1980 | Palmer | 192/111 A |
| 5,069,322 | 12/1991 | Mizukami et al. . | |
| 5,377,803 | 1/1995 | Link et al. . | |
| 5,419,418 | 5/1995 | Uenohara et al. . | |
| 5,564,542 | 10/1996 | Gochenour et al. | 192/70.25 |

FOREIGN PATENT DOCUMENTS

| | | | |
|---|---|---|---|
| 0568990 | 11/1993 | European Pat. Off. . | |
| 0622559 | 11/1994 | European Pat. Off. . | |
| 2463874 | 2/1981 | France . | |
| 2599446 | 12/1987 | France . | |
| 4322506 | 1/1994 | Germany . | |
| 2176256 | 12/1986 | United Kingdom . | |
| 2264989 | 9/1993 | United Kingdom | 192/111 A |

OTHER PUBLICATIONS

Patent Abstracts of Japan vol. 14 No. 52 (M–0928), Jan. 30, 1990 & JP–A–01 278931 (Komatsu) Nov. 9, 1989.

*Primary Examiner*—Richard M. Lorence
*Attorney, Agent, or Firm*—Longacre & White

[57] ABSTRACT

A friction clutch has device compensating for wear in the clutch friction wheel and, to a lesser extent, in the pressure plate and reaction plate of the clutch. The wear compensating device is of the type comprising a compensating device arranged between the thrust band and the pressure plate of the clutch, and the thrust band includes an abutment member cooperating with the cover plate for stabilising the position of the diaphragm when the clutch is engaged.

11 Claims, 3 Drawing Sheets

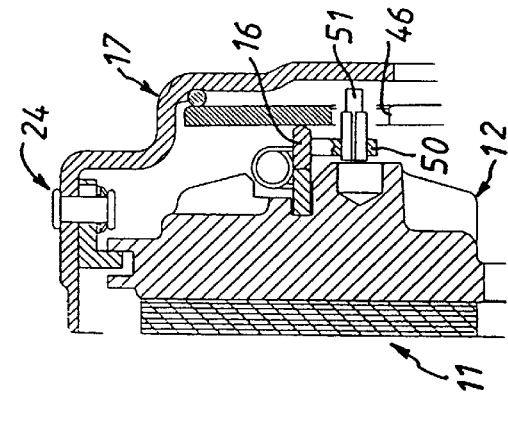
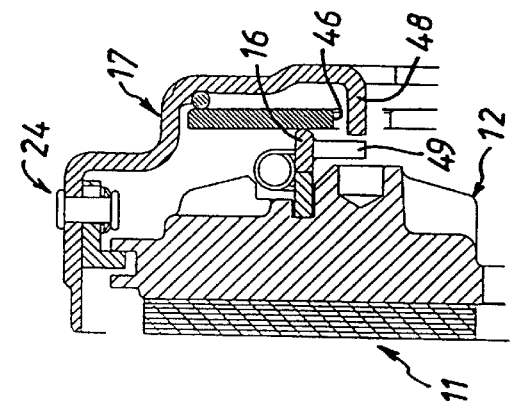
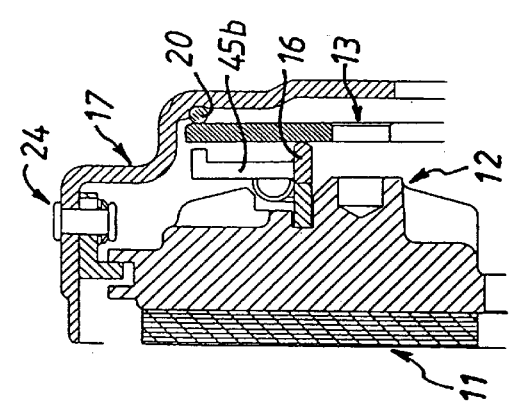
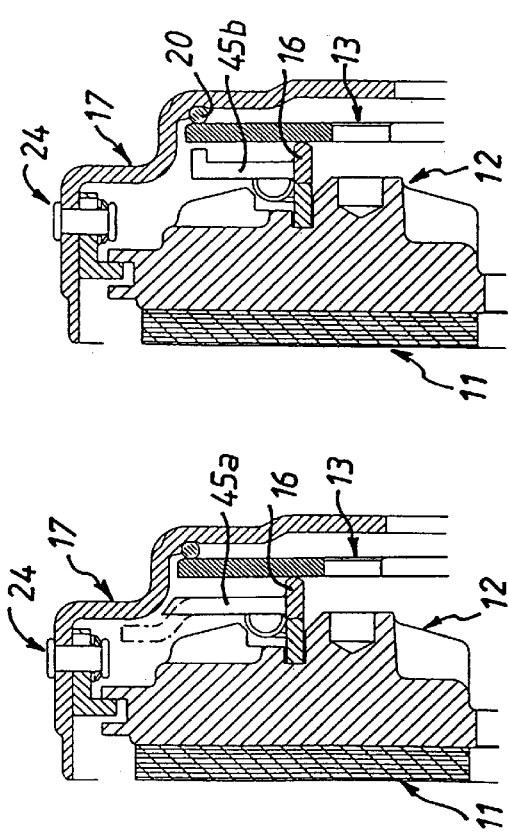
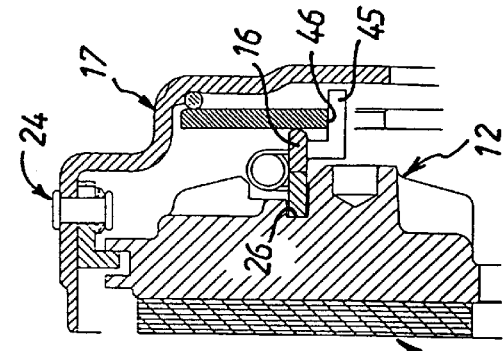
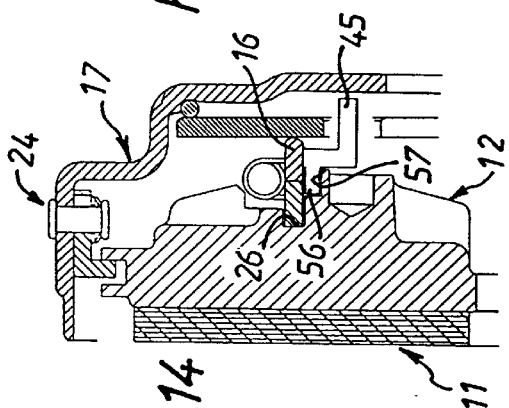
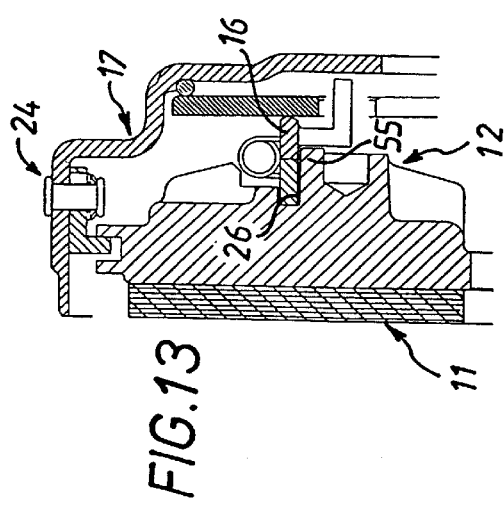

FRICTION CLUTCH WITH WEAR COMPENSATION

FIELD OF THE INVENTION

This invention relates to friction clutches, and more particularly to friction clutches having means for compensating for wear in the clutch.

BACKGROUND OF THE INVENTION

A friction clutch commonly comprises a pressure plate, a cover plate and a diaphragm, all coupled for rotation together, the diaphragm being actuated in axial deflection by a clutch release bearing. A thrust band, in the form of a crown which is carried by the pressure plate, is abutted on the diaphragm. In the engaged state of the clutch, the pressure plate is urged by the diaphragm into contact with the clutch friction wheel or clutch disc of the clutch. The clutch disc becomes progressively worn, which modifies little by little the axial positions of the various elements of the clutch, so that the working conditions of the diaphragm become gradually changed as a result.

More precisely, the clutch also includes a reaction plate which is mounted on a driving shaft for rotation with the latter, and the clutch friction wheel has at its outer periphery friction liners, while at its inner periphery it has a hub which is mounted on a driven shaft for rotation of the driven shaft with the friction wheel when the reaction plate is rigidly or resiliently coupled to the friction liners.

When the clutch is engaged, the engine torque is transmitted from the reaction plate to the hub of the clutch friction wheel, via the friction liners which are gripped between the pressure plate and reaction plate under the action of the diaphragm. The diaphragm is of frusto-conical form in the free state.

Wear occurs not only in the friction liners, but also, though to a lesser extent, in the pressure plate and reaction plate. During the working life of the clutch, this causes the pressure plate to become displaced towards the reaction plate, and this in turn results in a change occurring in the inclination of the diaphragm. It is therefore desirable to compensate for the above mentioned wear effects, in order that the diaphragm will have a substantially constant configuration when the clutch is engaged.

One wear compensating system is known that consists, firstly, of a compensating device having annular ramps, which incorporates the above mentioned thrust band. This wear compensating device is interposed between the thrust band and the pressure plate. The compensating device also includes means for limiting the course of travel of the pressure plate, which are displaceable automatically as a function of wear. This wear occurs mainly in the clutch friction wheel, and the travel limiting means is connected operatively between the pressure plate and the cover plate.

A system of that kind does not take account of the extent of displacement of the diaphragm. Now it is necessary in practice to arrange for a declutching over-travel, that is to say an additional deformation of the diaphragm between the position in which the clutch is effectively disengaged and the final position which corresponds to the end of the course of travel of the clutch pedal. As a result, there may be some lack of precision in the operation of the wear compensating system.

DISCUSSION OF THE INVENTION

An object of the invention is to eliminate the above mentioned disadvantage.

The basic principle of the invention consists in stabilising the position of the diaphragm when the clutch is engaged, by carefully controlling that of the thrust band.

According to the invention, a friction clutch of the type comprising a pressure plate, a cover plate, and a diaphragm, all rotatable together, with the diaphragm cooperating with a thrust band in the form of a crown and carried by the said pressure plate, together with wear compensating means comprising, firstly, a compensating device having annular ramps, which is biassed by at least one circumferentially acting spring acting between the said band and the said pressure plate, and secondly, means for limiting the course of travel of the said reaction plate, the said travel limiting means being displaceable automatically and arranged between the said pressure plate and the said cover plate, is characterised in that the said thrust band includes abutment means for cooperation with the said cover plate, whereby to stabilise the position of the said diaphragm in the engaged state of the clutch.

Thus, when the clutch is engaged, the diaphragm always occupies the same position, i.e. its inclination is substantially identical so that its position is stabilised.

The above mentioned abutment means may or may not cooperate directly with the cover plate, that is to say they can effectively engage either directly or indirectly on the cover plate. In the latter case the abutment means are engaged against another element which is not arranged to be displaced with respect to the cover plate, for example a fixed portion of the diaphragm which is not deformed during operation. In other words, the abutment means may be applied against the diaphragm, in the immediate vicinity of its pivoting circle, i.e. its circle of pivoting of engagement with the cover plate.

According to a preferred feature of the invention, the thrust band is part of a crown which is formed with ramps and which is adapted to cooperate with an intermediate crown formed with counter, or conjugate, ramps and carried by the pressure plate. This intermediate crown is preferably fitted in a groove of the pressure plate.

Further preferred features of the invention relate to the centring of the crown of the thrust band.

The invention will be better understood, and further advantages of the invention will appear more clearly, on a reading of the following description of preferred embodiments of the invention, in the form of various embodiments of a clutch in accordance with the invention, given by way of non-limiting example only and with reference to the accompanying drawings.

BRIEF DESCRIPTION OF THE DRAWINGS

FIG. 9 is a view similar to FIG. 1, but shows a first modified version of the abutment means.

FIG. 10 is a view similar to FIG. 1, but shows a second modified version of the abutment means.

FIG. 11 is a view similar to FIG. 1, but shows a third modified embodiment of the abutment means.

FIG. 12 is a view similar to FIG. 1, but shows a fourth modified embodiment of the abutment means.

FIG. 13 is a view similar to FIG. 1, but shows a first modification of the means for centring the crown of the thrust band.

FIG. 14 is a view similar to FIG. 1, shows a second modification of the means for centring the crown of the thrust band.

FIG. 15 is a view similar to FIG. 1, but shows a third modified version of the means for centring the crown of the thrust band.

DESCRIPTION OF PREFERRED EMBODIMENTS OF THE INVENTION

Figure 4:
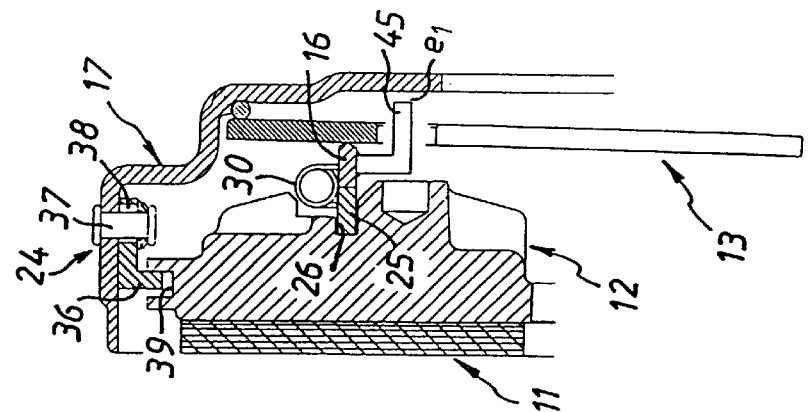
FIG. 4 is a view similar to FIG. 1, showing the clutch in the state where the clutch friction wheel has undergone some wear, so that the latter is no longer compensated.

Reference is first made in particular to FIGS. 1 to 7. These Figures show part of a friction clutch, and more particularly those elements that are relevant to the present invention, namely a clutch friction wheel or friction disc 11, having at its outer periphery friction liners shown in the drawings; a pressure plate 12; and a metallic diaphragm 13 in the form of a disc, which constitutes an axially acting spring that exerts a force on the pressure plate 12 through an annular thrust band 16, in the form of a crown carried by the pressure plate 12. In this example, all of these components are mounted within a cover plate 17 which is adapted to be fixed on a reaction plate (not shown) of the clutch.

More precisely, the thrust band 16 has a tapered edge 18 on which the diaphragm is engaged. The diaphragm pivots in the region of its outer edge on a wire ring 20 which is fixed to the inside of the cover plate 17, and which defines a pivot circle for the diaphragm on the cover plate. In this example the ring 20 is a separate component from the cover plate 17, though it may of course be integral with the cover plate and may be formed by pressing out.

The diaphragm, which is frusto-conical in the free state, is conventionally actuated axially, in this example in a traction mode, by a clutch release bearing which is not shown. The clutch release bearing is itself displaced by a clutch mechanism linked to the clutch pedal. The pressure plate 12, the diaphragm 13, the thrust band 16 and the cover plate 17 are all arranged for rotation together. The pressure plate 12 is coupled to the cover plate 17 by means of conventional tangential tongues, not shown, which constitute axially acting resilient means that tend to displace the support plate of the clutch friction wheel 11 into the disengaged position. The pressure plate 12 also carries axially oriented pins, not shown, which are arranged to cooperate with the edges of widened apertures or windows 46 which are formed in the diaphragm 13 at the inner periphery of its Belleville ring portion. These apertures and pins can be seen in FIGS. 14 and 17 of French patent specification FR 2 463 874 A, to which reference is invited for further details, especially as regards the reaction plate and the clutch release bearing.

In the present example, the apertures 46 are rectangular, and are for this reason referred to in the rest of this description as the windows 46. These windows 46 constitute the ends of the slots that separate the fingers of the diaphragm from each other. It is on the inner ends of the fingers of the diaphragm that the clutch release bearing works in traction. As will have been understood, the above mentioned pins are stop pins, which prevent rotation of the diaphragm 13.

In a modified version, this rotation can be prevented by means of axial lugs which project from the base of the cover plate 17, and which engage in a complementary manner in the windows 46. Such lugs are similar to the lugs 48 in FIG. 11, to which reference will later be made.

Means for compensating for wear in the friction disc 11 are provided. These consist firstly of a compensating device 22 arranged between the thrust band 16 and the pressure plate 12, and secondly means 24 for limiting the travel of the pressure plate. These travel limiting means are displaceable under the biassing action of the diaphragm in the event of wear, in particular wear of the friction liners of the clutch friction wheel 11, and, to a lesser extent, wear in the friction faces offered by the pressure plate and reaction plate to the friction liners. The travel limiting means are arranged between the pressure plate 12 and the cover plate 17.

Figure 8:
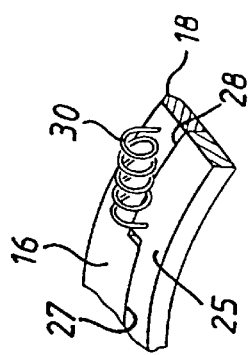
FIG. 8 is a perspective scrap view showing more particularly the thrust band, and the compensating means with ramps that enables wear to be taken up.

In the present example, FIG. 8 shows best the structure of the compensating means 22. The crown of the thrust band 16 is mounted on an intermediate crown 25 which is lodged in a coaxial groove 26, having a circular profile, of the pressure plate 12. The crown of the thrust band 16 includes ramps 27, while the intermediate crown 25 includes ramps 28 that constitute counter ramps or conjugate ramps. These ramps 27 and 28 cooperate with each other in such a way that the distance between the pressure plate 12 and the edge 18 of the thrust band, in the axial direction of the assembly, is able to vary during relative rotation between the two crowns 16 and 25. These two crowns are in this example made of press formed metal plate. At least one axially acting spring 30 is mounted between the two crowns 16 and 25 so as to cause such relative rotation to take place in a direction which tends to increase this distance. In this example three of the springs 30 are provided, these being tension springs spaced apart at regular intervals circumferentially.

In addition, the travel limiting means 24 comprise L-shaped lugs 36 which are fixed to the cover plate 17, and which are engaged in peripheral external notches 39 formed in the thickness of the pressure plate 12. These notches 39 may be replaced by an external peripheral groove of the pressure plate 12. Each lug 36 is fixed to the cover plate 17 by means of a rivet 37, which extends through an axially oblong hole 38 in the lug. A spring washer 40 is fitted between each lug 36 and the head of the corresponding rivet 37. The loading exerted by the washer 40 is such that the lugs 37 are able to is be displaced by cooperation with the face or edge of the notch 39 that lies furthest away from the clutch friction wheel 11 in the direction indicated by the arrow F, under the action of the pressure plate which is itself biassed by the diaphragm, at the instant of engagement of the clutch, if wear has occurred in the clutch friction wheel.

However, the lugs 36 are unable to return in the opposite direction under the action of the pressure plate biassed by the above mentioned tangential tongues. That face of the notch 39 which is closest to the friction wheel 11 therefore limits the displacement of the pressure plate 12 towards the base of the cover plate 17 by cooperation with the transverse portion of the lugs 36. It can thus be seen that the lugs 36 are displaced progressively, parallel to the direction of the arrow F, throughout the whole useful life of the clutch.

Figure 1:
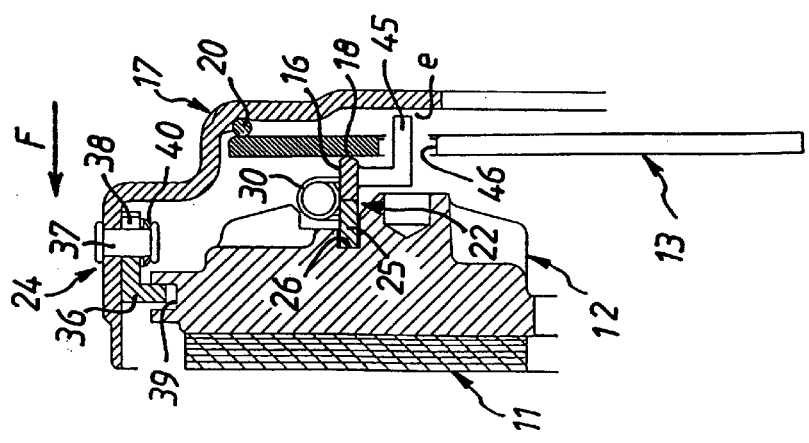
FIG. 1 is a view in axial cross section of part of a friction clutch in accordance with the invention, seen in its new state (i.e. when unused) and in the position in which the clutch is engaged.

In addition, in the clutch provided in accordance with the invention, the thrust band 16 is provided with abutment means which cooperate with the cover plate 17 in order to stabilise (or determine) the position of the diaphragm 13 in the engaged state of the clutch. These abutment means consist, in this example, of abutment elements 45 which are fixed laterally to the thrust band 16 and which extend through the windows 46 of the diaphragm so that they can engage against the cover plate 17, and more precisely against the base of the latter. As can be seen in FIG. 1, the abutment elements 45 are L-shaped in profile.

The operation of the wear compensating means will now be described with reference to FIGS. 1 to 8.

In FIG. 1, the clutch, which is shown in its new state, i.e. with the friction liners of the clutch friction wheel, is shown in the engaged and adjusted state of the clutch. The pressure plate 12 is thus applied by the force of the diaphragm 13 against the clutch friction wheel 11, and the lugs 36 are in contact with the rear faces or edges of the corresponding notches 39. In this example, the expressions "front" or "rear" are to be considered with reference to the direction of the arrow F. The crowns 16 and 25 are disposed as shown in FIG. 8, the ramps 27 and 28 being totally engaged one inside the other in such a way that the combined width of the crowns 16 and 25 has a minimum value, in a direction parallel to the axis.

Each lug 36 is positioned in such a way that the front edge of the corresponding oblong hole 38 is in contact with the rivet 37, subject to any fitting clearance. There is thus a small space between the front edge of each hole 38 and the associated rivet 37. The width of each notch 39 is of course greater than the thickness of the associated lug 36. A predetermined clearance e is set up between the end of each abutment element 45 and the rear wall (i.e. the base) of the cover plate 17. This clearance e is generally equal to the clearance that exists between each notch 39 and the associated lug 36. It defines the lift of the pressure plate 12, that is to say the distance between the pressure plate 12 and the friction wheel 11.

Figure 3:
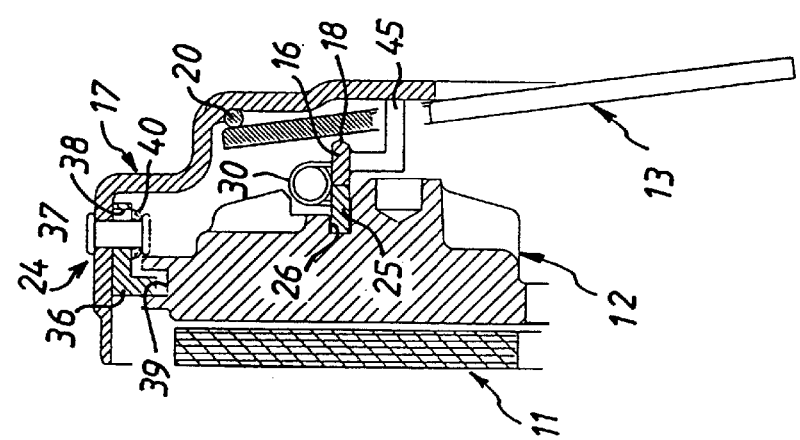
FIG. 3 is a view similar to FIG. 2 showing the behaviour of the clutch during the overrun of the diaphragm.
Figure 2:
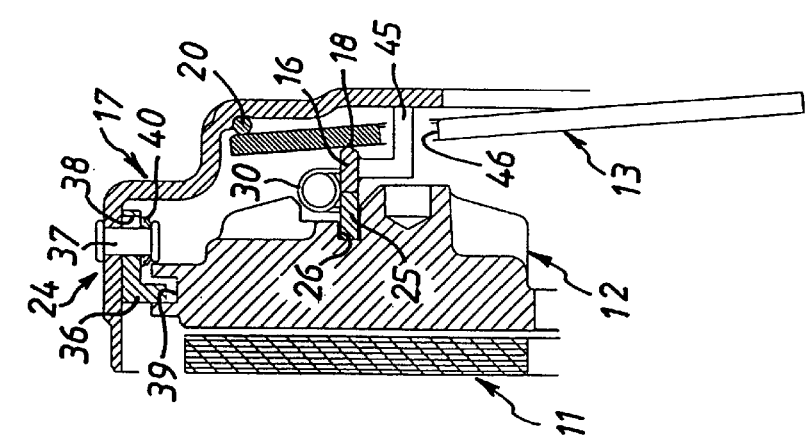
FIG. 2 is a view similar to FIG. 1 showing the same new clutch at the end of the working travel of its declutching operation.

In the declutching operation illustrated in FIGS. 2 and 3, the diaphragm 13 is deformed, i.e. it becomes inclined, in such a way as to permit the withdrawal of the pressure plate until the lugs 36 come into contact with the front edges of the corresponding notches 39. At the same time, the abutment elements 45 come into contact with the rear wall of the cover plate 17.

The situation shown in FIG. 2 represents the working travel of the diaphragm which enables effective disengagement of the clutch to take place, with a clearance appearing between the pressure plate 12 and the liners of the friction wheel 11, in order to avoid any contact.

FIG. 3 shows the overtravel of the diaphragm 13, and it can be seen that the thrust band 16 is immobilised by the abutment elements 45, which leads to separation between the diaphragm and the band 16.

In FIG. 4, to which reference is now made, it is supposed that the friction wheel 11 has undergone some degree of wear. The clutch is shown here in its engaged position. Under these conditions, the diaphragm 13 has pushed the lugs 36 through a distance which corresponds to the wear in the clutch friction wheel 11. By contrast, wear in the band has not yet been taken up: this will be done during the next following declutching operation. As a consequence, the distance between the abutment elements 45 and the rear wall of the cover plate 17 is thus increased by the amount of the wear, so that a clearance $e_1$ appears, this being greater than the clearance e.

Figure 7:
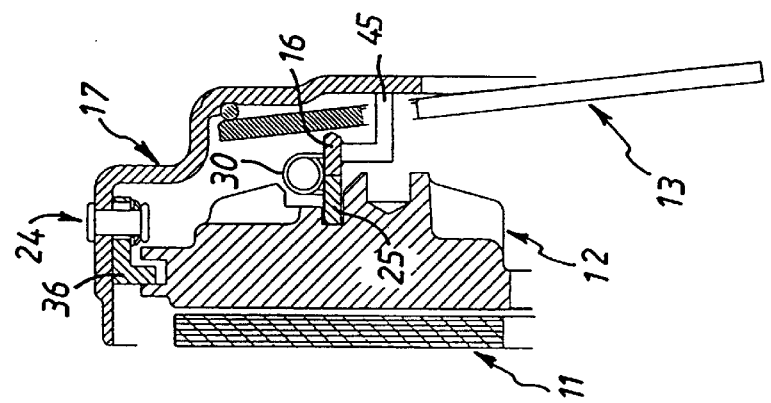
FIGS. 5 to 7 are views similar to the foregoing Figures, and illustrate how wear is taken up during a declutching operation.
Figure 6:
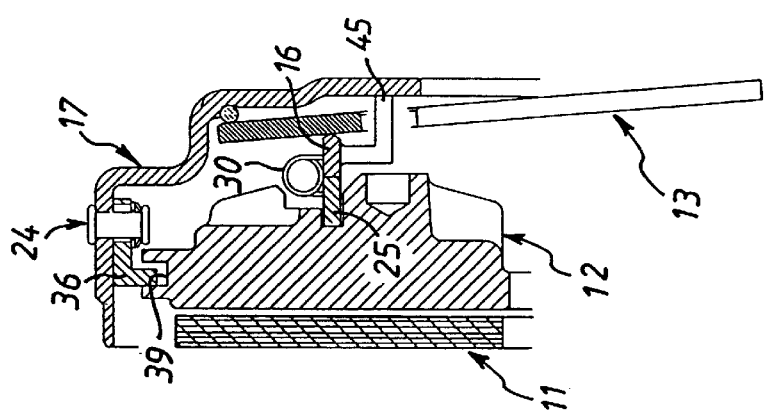
Figure 5:
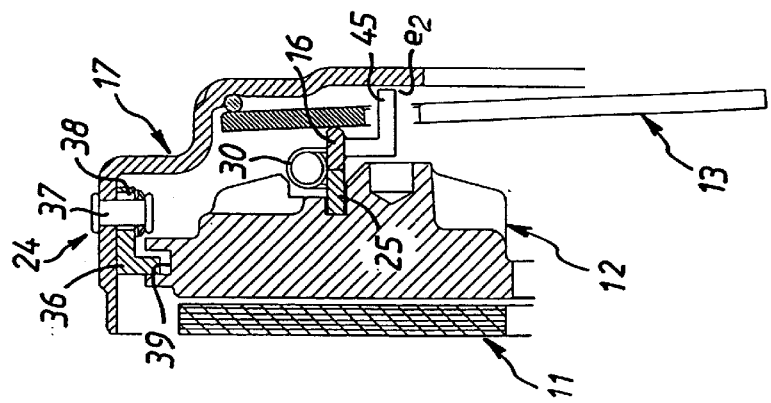

At the instant when the next following declutching operation takes place, illustrated in FIGS. 5 to 7, the deformation of the diaphragm 13 first causes the pressure plate to be withdrawn, so that it becomes disengaged from the clutch friction wheel 11 as in FIG. 5. Further deformation of the diaphragm causes the abutment elements 45 to make contact against the cover plate 17 as shown in FIG. 6. Between these two positions of the diaphragm, the two crowns 16 and 25 are able to rotate one with respect to the other under the action of the spring 30, so that the edge 18 of the band 16 regains its initial position.

More precisely, in a first step, the pressure plate 12 comes into abutment on the lugs 36, with the front edges of the slots 39 coming into abutment against the transverse portion of the lugs 36 as shown in FIG. 5. In this position a clearance $e_2$, corresponding to the wear that has taken place in the friction liners and/or in the pressure and reaction plates, exists between the abutment elements 45 and the base of the cover plate 17. As the movement of the diaphragm is continued still further, the pressure plate 12 then becomes immobilised, and a clearance appears between the diaphragm 13 and the band 16. This clearance is taken up automatically due to the spring or springs 30, which cause the crown 25 to rotate and the band 16 to move axially due to the presence of the conjugate ramps 27 and 28. This relative movement continues until the elements 45 come into abutment against the base of the hollow cover plate 17.

It will be noted that the pressure plate 12 remains undisplaced, having regard to the fact that the return force exerted by the tangential tongues is insufficient to displace the lugs 36. This position is self-stabilising, i.e. it remains identical, in spite of the overtravel of the diaphragm as illustrated in FIG. 7, because the band 16 is held stationary by the abutment elements 45. Thus, the diaphragm 13 still occupies the same position when the clutch is in the engaged state, so that the said position is stabilised.

It will be noted that wear compensation is self-adjusting during the first declutching operation. In this connection, after the assembly consisting of the cover plate 17, pressure plate 12, and diaphragm 13 has been fastened on the reaction plate, with the clutch friction wheel 11 fitted, the pressure plate 12 first abuts against the lugs, and then the crown 16 comes into abutment, through its elements 45, on the cover plate as in FIG. 7. For this reason, a clearance appears in FIG. 8 between the crowns 25 and 16, the clutch being adjusted as described above with reference to FIG. 1.

Reference is now made to FIGS. 9 to 12, which show modified versions of the abutment elements fixed to the band 16. In these Figures, those structural elements which are similar to those in the embodiment described above carry the same reference numerals.

In the embodiment shown in FIG. 9, the abutment means consist of abutment elements 45a which are fixed laterally to the band 16, so as to project radially outwardly of the latter. These abutment elements 45a bear against a portion of the cover plate 17 lying near to the outer periphery of the latter, without passing through the diaphragm 13.

A similar arrangement is shown in FIG. 10, in which the abutment means consist of abutment elements 45b which are fixed to the band 16 so that they project radially outwardly from the latter, to bear on the diaphragm 13 in the immediate vicinity of its circumference or circle of engagement with the cover plate 17, or pivoting circle. More precisely, the ends of the abutment elements 45b lie facing towards the outer edge of the diaphragm, in register with the abutment ring 20. These abutment elements 45b thus come into engagement against the cover plate through a fixed, rather than a deformable, portion of the diaphragm 13.

In FIG. 11 the abutment means comprise, firstly, lugs 48 which are press-formed in the cover plate 17 and bent axially inwardly as shown. These lugs extend through the windows 46 in the diaphragm, towards the pressure plate 12. Under these conditions, the band 16 is provided with at least one lateral extension 49 which cooperates with the lugs 48 of the cover plate. The distance e is defined between the extension 49 and the ends of the lugs 48. In this embodiment, the lateral extension 49 may be in the form of a continuous crown, or it may alternatively consist of separate lugs, each of which corresponds to one lug 48.

It will be noted that the lugs 48 can also serve to prevent the diaphragm rotating, by cooperating with the edges of the windows 46, the lugs 48 being flat and thin, i.e. they are thin in the radial direction and longer in the circumferential direction.

In the embodiment shown in FIG. 12, each abutment element consists of a lateral lug 50 carrying a force-fitted projecting pin 51. This arrangement facilitates adjustment of the predetermined distance defined between the abutment means and the cover plate.

It should be noted that in the embodiments shown in FIGS. 1 and 12, it is the crown 25 which is displaced in rotation in the groove 26 while wear is being taken up, because the band 16 is unable to rotate with respect to the diaphragm 13. The crown 25 is thus movable in rotation but fixed in straight line movement, while the crown of the thrust band 16 is displaced in straight line movement (or translation) but secured against rotation.

In the embodiments of FIGS. 9 to 11, in which the abutment means 45a, 45b, 49 do not pass through the diaphragm, the crown 16 is displaceable in rotation and, in consequence, the crown 25 can be fixed to the reaction plate 12, and can even be directly machined in the latter.

In every case, there is a problem in centring of the crown 16. The latter must, in this connection, be such as to constitute a permanent axial extension of the crown 25. For example, in the embodiment shown in FIG. 1, this centring may be obtained in a simple way due to the fact that the crown of the thrust band 16 and the intermediate crown 25 are coupled to each other circumferentially through at least three springs 30, which are spaced apart at regular intervals circumferentially, and which are disposed radially outside the two crowns. In that case, it is accordingly the number of these springs and their circumferential disposition that determines the centring of the crown of the band.

More precisely, the springs 30, being in this example tension springs as previously mentioned, can have their two ends anchored respectively in the crown 25 and in the crown 16. Other arrangements are however possible. Thus, in the embodiment shown in FIG. 13, to which reference is now made, the crown 16 of the band is held centred by at least one cylindrical extension 55 of one wall of the groove 26. This extension comes into contact with a portion of the lateral surface of the crown 16, and consequently holds it centred. This cylindrical extension may of course also be replaced by simple abutments spaced apart circumferentially on a cylindrical surface which extends the wall of the groove 26.

In the further embodiment shown in FIG. 14, the crown 16 of the thrust band is maintained centred by lugs 56 which are fixed to the abutment means constituted by the abutment element 45. These lugs 56 cooperate with a centred cylindrical reference surface 57 of the reaction plate 12.

Finally, in the further embodiment shown in FIG. 15, the crown 16 of the thrust band is held centred by cooperation between the abutment elements 45 and the edges of the windows 46 in the diaphragm through which they pass. This arrangement does call for a particular setting of the fitting clearance between the elements 45 and the edges of the windows 46 in the diaphragm.

In FIG. 9, the member 45 can of course have a serpentine form, as is shown for instance in phantom lines in FIG. 9, so that it engages against the outer radial flange of the cover plate 17.

It has been stated that the two crowns 16 and 25 form axial extensions of each other. They can be formed from the same tube. To this end they are preferably made of metal. Then, starting from a single tube, it is possible to cut the ramps 27 and 28 simultaneously and in a precise way using a laser beam. The crowns 16 and 25 are thus obtained inexpensively but with great precision by laser cutting.

In addition, the pressure plate 12, which is of a mouldable material and is typically a casting, is of a simple form in which the groove 26 for housing the crown 25 can be easily made, for example by moulding, with a final turning operation if necessary.

The wear compensating device 22 is thus made in a way that is both simple and inexpensive, and is reliable in operation.

The present invention is of course not limited to the embodiments described above and shown in the drawings. In particular, the notches 39 may be formed in components which are attached to the outer periphery of the pressure plate 12. These may for example consist of a plurality of screws having heads in which the notches 39 are formed.

The means for limiting the course of travel of the pressure plate 12 may take some other form. For example it may consist of a bar carrying a resiliently deformable wire ring and extending axially. This bar is slid into position, gripped in an axial bore of the pressure plate, and secured to the cover plate. The wire ring carried by the bar slides in this bore. For more details about this arrangement, reference is invited to FIG. 3 of French patent specification No. FR 2 599 446 A. It is of course possible to employ the means for limiting the course of travel of the pressure plate which are shown in FIGS. 1 and 5 of that specification, namely split pins which are frictionally mounted in holes in the pressure plate, and a ring which is frictionally mounted on the outer periphery of the pressure plate, and which has radial projections that are engaged in oblong holes in the cover plate.

The same French patent specification FR 2 599 446 A also shows, in FIGS. 1 and 3, the pins for preventing the diaphragm from rotating.

What is claimed is:

1. A friction clutch comprising: a pressure plate; a cover plate; a diaphragm; a thrust band constituting a first crown carried by said pressure plate; and wear compensating means comprising a wear compensating device and means for limiting the course of travel of said pressure plate, the wear compensating device comprising means disposed operatively between said band and said pressure plate and defining cooperating annular ramps, the wear compensating device further comprising at least one circumferentially acting resilient spring connected between said ramps, said travel limiting means being arranged operatively between the pressure plate and the cover plate so as to be displaceable automatically, wherein the thrust band includes abutment means cooperating with the cover plate for stabilising the position of the diaphragm when the clutch is engaged, wherein said abutment means comprise abutment elements fixed laterally to said band, the diaphragm defining windows, said abutment elements extending through said windows for engagement against the cover plate.

2. A clutch according to claim 1, wherein the abutment elements have an L-shaped profile.

3. A clutch according to claim 1, wherein each said abutment element comprises a pin force-fitted in said band.

4. A clutch according to claim 1, wherein said means defining ramps consist of the first crown of said thrust band, defining first ramps, and an intermediate crown defining second, conjugate, ramps cooperating with said first ramps, said intermediate crown being interposed between the crown of said thrust band and the pressure plate, the pressure plate having a centered circular groove, and said intermediate crown being housed in the said groove.

5. A clutch according to claim 4, wherein said groove defines a wall, pressure plate defining at least one cylindrical lengthwise extension of the said wall, the said extension cooperating with the crown of the said thrust band for centring the latter.

6. A clutch according to claim 4, further including at least three springs spaced apart circumferentially at regular intervals and disposed radially on the outside said crown of the thrust band and said intermediate crown, each said spring being attached to both crowns so as to couple the latter resiliently and circumferentially to each other.

7. A clutch according to claim 4, wherein said crowns are formed from the same tube by simultaneous cutting by means of a laser beam.

8. A clutch according to claim 1, wherein said windows in the diaphragm define edges of the windows, said abutment elements extending through said windows and cooperating with said edges of the latter whereby to maintain centered said crown of the thrust band.

9. A friction clutch comprising: a pressure plate; a cover plate; a diaphragm; a thrust band constituting a first crown carried by the said pressure plate; and wear compensating means comprising a wear compensating device and means for limiting the course of travel of said pressure plate, the wear compensating device comprising means disposed operatively between said band and said pressure plate and defining cooperating annular ramps, the wear compensating device further comprising at least one circumferentially acting resilient spring connected between said ramps, said travel limiting means being arranged operatively between the pressure plate and the cover plate so as to be displaceable automatically, wherein the thrust band includes abutment means cooperating with the cover plate for stabilisinm the position of the diaphragm when the clutch is engaged, and the cover plate defines a pivot circle, with the diaphragm engaging on said pivot circle for pivoting displacement with respect to the cover plate on the pivot circle as fulcrum, said abutment means consisting of abutment elements fixed laterally to said band and extending towards the diaphragm for engagement with the diaphragm in the immediate vicinity of said pivot circle of the cover plate, whereby the said abutment elements can engage against the cover plate through a portion of the diaphragm that is fixed rather than deformable.

10. A friction clutch comprising: a pressure plate; a cover plate; a diaphragm; a thrust band constituting a first crown carried by the said pressure plate; and wear compensating means comprising a wear compensating device and means for limiting the course of travel of said pressure plate, the wear compensating device comprising means disposed operatively between said band and said pressure plate and defining cooperating annular ramps, the wear compensating device further comprising at least one circumferentially acting resilient spring connected between said ramps, said travel limiting means being arranged operatively between the pressure plate and the cover plate so as to be displaceable automatically, wherein the thrust band includes abutment means cooperating with the cover plate for stabilising the position of the diaphragm when the clutch is engaged, and the diaphragm defines windows, the cover plate has a plurality of press-formed lugs bent back axially and extending through said windows in the diaphragm towards the pressure plate, said thrust band having at least one lateral extension, and said abutment means comprising said lugs of the cover plate and said at least one lateral band extension, with the latter cooperating with said lugs.

11. A friction clutch comprising: a pressure plate; a cover plate; a diaphragm; a thrust band constituting a first crown carried by the said pressure plate; and wear compensating means comprising a wear compensating device and means for limiting the course of travel of said pressure plate, the wear compensating device comprising means disposed operatively between said band and said pressure plate and defining cooperating annular ramps, the wear compensating device further comprising at least one circumferentially acting resilient spring connected between said ramps, said travel limiting means being arranged operatively between the pressure plate and the cover plate so as to be displaceable automatically, wherein the thrust band includes abutment means cooperating with the cover plate for stabilising the position of the diaphragm when the clutch is engaged, said means defining ramps consist of the first crown of said thrust band, defining first ramps, and an intermediate crown defining second, conjugate, ramps cooperating with said first ramps, said intermediate crown being interposed between the crown of said thrust band and the pressure plate, the pressure plate having a centered circular groove, and said intermediate crown being housed in said groove, and the pressure plate defines a centered cylindrical reference surface, the clutch further including lugs fixed to said abutment means and cooperating with said reference surface, said lugs centring said crown of the thrust band.

* * * * *